United States Patent
Kuosa et al.

(10) Patent No.: US 9,809,496 B2
(45) Date of Patent: Nov. 7, 2017

(54) ADDITIVE FOR CEMENTITIOUS MATERIALS

(71) Applicant: UPM-Kymmene Corporation, Helsinki (FI)

(72) Inventors: Hannele Kuosa, Espoo (FI); Anna Suurnakki, Espoo (FI); Antti Laukkanen, Helsinki (FI); Jan-Erik Teirfolk, Turku (FI); Markku Leivo, Espoo (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/915,664

(22) PCT Filed: Aug. 28, 2014

(86) PCT No.: PCT/FI2014/050656
§ 371 (c)(1),
(2) Date: Mar. 1, 2016

(87) PCT Pub. No.: WO2015/033018
PCT Pub. Date: Mar. 12, 2015

(65) Prior Publication Data
US 2016/0257614 A1  Sep. 8, 2016

(30) Foreign Application Priority Data

Sep. 6, 2013 (FI) ..................... 20135899

(51) Int. Cl.
*C04B 24/38* (2006.01)
*C04B 28/02* (2006.01)
*C04B 38/02* (2006.01)
*C04B 38/10* (2006.01)
*C04B 20/00* (2006.01)
*C04B 7/36* (2006.01)
C04B 103/48 (2006.01)
C04B 111/00 (2006.01)
C04B 111/20 (2006.01)

(52) U.S. Cl.
CPC ............. *C04B 24/383* (2013.01); *C04B 7/36* (2013.01); *C04B 20/006* (2013.01); *C04B 28/02* (2013.01); *C04B 38/02* (2013.01); *C04B 38/10* (2013.01); *C04B 2103/48* (2013.01); *C04B 2111/00103* (2013.01); *C04B 2111/29* (2013.01); *Y02W 30/97* (2015.05)

(58) Field of Classification Search
CPC ....... C04B 28/02; C04B 28/18; C04B 24/383; C04B 38/10; C04B 38/02; C04B 20/006; C04B 20/008; C04B 7/36; C04B 7/02; C04B 18/24; C04B 40/024; C04B 2103/48; C04B 2103/304; C04B 2111/00103; C04B 2111/29

See application file for complete search history.

(56) References Cited

U.S. PATENT DOCUMENTS 3,834,918 A   9/1974 Uogaeshi

FOREIGN PATENT DOCUMENTS

| CN | 1438918 A | 8/2003 |
|---|---|---|
| CN | 102557542 A | 7/2012 |
| CN | 102633526 A | 8/2012 |
| FR | 2783437 A1 | 3/2000 |
| JP | 2001058888 A | 3/2001 |
| KR | 20100094106 A | 8/2010 |
| WO | 2011039423 A1 | 4/2011 |
| WO | 2011044604 A1 | 4/2011 |

OTHER PUBLICATIONS

Machine Translation of French Patent Specification No. FR 2783437 A1 (Mar. 2000).*
Cervin, et al., "Lightweight and Strong Cellulose Materials Made From Aqueous Foams Stabilized by Nanofibrillated Cellulose" Biomacromolecules 2013 (published Dec. 19, 2012), vol. 14, 503-511.
International Search Report dated Dec. 2, 2014; International Application No. PCT/FI2014/050656; International Filing Date Aug. 28, 2014 (2 pages).
Written Opinion mailed Dec. 2, 2014, International Application No. PCT/FI2014/050656; International Filing Date Aug. 28, 2014 (6 pages).

* cited by examiner

*Primary Examiner* — Anthony J Green
(74) *Attorney, Agent, or Firm* — Cantor Colburn LLP

(57) ABSTRACT

The invention relates to use of nano-fibrillar cellulose as an gas-entrainment stabilizer, which when used in cementitious materials, provides improved gas pore structure quality and/or stability and/or robustness with regard to water content variation. The invention further relates to a method for stabilizing gasentrainment of cementitious materials and to a method for providing cementitious material with improved air pore structure quality and/or stability and/or robustness with regard to water content variation.

32 Claims, 7 Drawing Sheets 1a 1b

ADDITIVE FOR CEMENTITIOUS MATERIALS

CROSS-REFERENCE TO RELATED APPLICATIONS

This application is a National Stage application of PCT/FI2014/050656, filed Aug. 28, 2014, which claims the benefit of Finnish Application No. 20135899, filed Sep. 6, 2013, both of which are incorporated by reference herein in their entirety.

FIELD OF THE INVENTION

The present invention relates to gas-entrainment of cementitious materials, in particular to use of nanofibrillar cellulose (NFC) as a gas-entraining stabilizer in providing improved gas pore structure quality and/or stability of cementitious materials and/or robustness with regard to water content variation.

BACKGROUND OF THE INVENTION

Freeze-thaw cycles may cause damage to concrete and other hardened cementitious materials due to freezing and expanding of water. While such hardened materials appear solid they are porous, having small capillaries resulting from the evaporation of water beyond that required for the hydration reaction during the curing of the material. Excess water that is not required for the cement particles to hydrate evaporates, leaving little pores in its place. En-vironmental water can later fill these voids. During freeze-thaw cycles, the water occupying those pores expands and creates tensile forces to the structure leading to cracks, fissures and surface scaling of concrete. Concrete may have 10% water capillaries due to extra water used in the production to give workability to the concrete in the production phase. In order frost damage to occur, the concrete must be almost saturated, meaning capillaries need to be full of water.

Gas-entrainment, in particular air-entrainment, of concrete increases the durability of the hardened concrete in climates subject to freeze-thaw. Furthermore, it increases workability of the concrete while in a plastic state. In air-entrained concrete, air voids are formed in a way that they intersect the capillaries at regular intervals. Preferably the maximum distance from any point in the capillary system to the surface of the nearest air bubble (void spacing factor) is 0.2 mm. When the concrete becomes wet, water will end up to the capillary system by capillary suction and for the most part the air voids remain empty. When the water in the capillaries starts to freeze, the pressure in the capillary system rises. Before the pressure reaches to a level where it could cause cracking, the water is forced into the air voids and the pressure drops.

Good and robust gas entrainment of cementitious materials consists of both the creation of small gas pores during mixing of the material, and also high stability of these pores before curing i.e. setting and hardening. Robust gas-entrainment refers to the possibility to have some variation in the water content in concrete production, without causing any significant variation in the gas pore structure.

Gas entrainment is attained by use of gas-entraining agents or admixtures, in particular air-entraining agents or admixtures (AEAs), added during mixing or included in a premixed cementitious composition. Entrained air is produced during mechanical mixing of the fresh cementitious material containing AEA. The shearing action of mixer blades breaks up the air into a fine system of bubbles and the AEA acts like surfactants and helps to create smaller air bubbles. In short, concrete air-entrainment means introduction of small, sub-millimeter air pores (0.020 to 0.500 mm) into fresh concrete and cement paste (water+cement) during the concrete mixing process (4 to 8 vol % in concrete and 13 to 25 vol % in cement paste). Yield value and viscosity of cement paste also has an effect on the stability of air in the concrete as high yield value and high viscosity stabilizes the air bubbles in concrete. Entrainment of gases other that air can be achieved for example by use of chemically reactive agents that produce gas, in particular hydrogen, when they react with suitable components of the cementitious composition and/or water during mixing.

Surface active AEAs are commonly and widely used in the production of air-entrained concrete to protect it against frost actions. However, with the known AEAs detailed care must be taken to select proper conditions for avoiding large variations in air content and quality of both fresh and hardened cementitious material. Air pores and other gas pores have a tendency to rise due to buoyance resulting to inhomogeneous variation in the gas pore structure in hardened cementitious material. Usually this separation has been taken into account by increasing the total air content. Migration of gas pores towards the surface of the cementitious layer can cause detrimental results especially in applications where the hardened material is cast into a mold for setting and hardening. Often in these applications the final surface which will be exposed to environment is the bottom part of the cast. The bottom part will, as a result of the rising air bubbles, have poorer air pore quality and will be more prone to cracking caused by freeze-thaw cycles.

There are some possible ways to increase air content stability. Fine particles can be added, commercial stabilizers can be used, and a good air pore structure and small enough pores can be produced by choosing a good mix design and production method, if only possible and economically viable. Water content of cementitious material also should be just high enough to produce separate and small air bubbles. All these methods may work, but there efficiency, usability and expenses vary. There is no generally guaranteed way to produce good gas-entrained cementitious material with desired properties.

BRIEF DESCRIPTION OF THE INVENTION

An object of the present invention is thus to provide a method for the gas-entrainment of cementitious materials so as to overcome the above problems. The objects of the invention are achieved by use of nanofibrillar cellulose (NFC) as a gas-entraining stabilizer in cementitious materials, a method for stabilizing gas-entrainment of cementitious materials, a method for the preparation of gas-entrained concrete, and a hardened gas-entrained cementitious material with improved gas pore structure and/or quality and/or robustness with regard to water content variation of gas-entrained cementitious material with improved air pore structure quality and/or stability, all which are characterized by what is stated in the independent claims. The preferred embodiments of the invention are disclosed in the dependent claims.

Now a way to improve stabilization of gas-entrainment of cementitious materials has been found experimentally. This can be achieved by use of nanofibrillar cellulose (NFC) which can be added to a cementitious composition prior to mixing. NFC, used together with at least one gas-entraining agent or admixture, can be used to improve the gas pore structure quality and/or stability and/or robustness with regard to water content variation of a wide variety of cementitious materials, including air-entrained concrete and foamed or light-weight concrete.

In order to provide hardened gas-entrained cementitious materials with improved gas pore structure and/or quality and/or robustness with regard to water content variation, the cementitious composition needs to contain at least 0.01% (w/w) of dry NFC based on the dry weight of binder in the cementitious composition. The required amount of NFC is dependent on the water/cement ratio of the cementitious paste and the nature of NFC. Mixed in the cementitious paste NFC increases the yield value of cement paste, and thus prevents the segregation and/or coalescence of small gas bubbles in the mass.

Hardened gas-entrained cementitious material is either produced though the use of a premixed cementitious composition comprising at least one gas-entraining agent or by introducing gas-entraining agent as the cementitious paste is mixed on the site. NFC can be added at the same time as the gas-entraining agent, or if the gas-entraining agent has already been premixed, NFC can be added prior to mixing or as the cementitious paste is mixed. As the cementitious paste has set and formed the hardened gas-entrained cementitious material, the cast of the original gas bubbles is left behind in the hardened material as voids. This is commonly referred to as the air-void system. The use of NFC as a stabilizer of the gas-entrainment results in a hardened gas-entrained cementitious material that has low density differences between the fresh paste and the hardened material and the density of the upper and lower part of the hardened material is about the same. Further the gas pore quantity and density are not easily dependent on the change of the amount of water in the cementitious paste, i.e. air-entrainment is robust.

The gas pore structure quality of the hardened material can be determined by the major parameters of the air-void system i.e. air content, spacing factor, and specific surface of the air voids. Besides, the bubbles should be uniformly distributed over the system. The relative distance between the voids is termed as the spacing factor. A smaller spacing is better. The specific surface, expressed as square millimeters per cubic millimeter, indicates the average size of the gas bubbles. A larger specific surface indicates smaller bubbles and is thus desirable.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
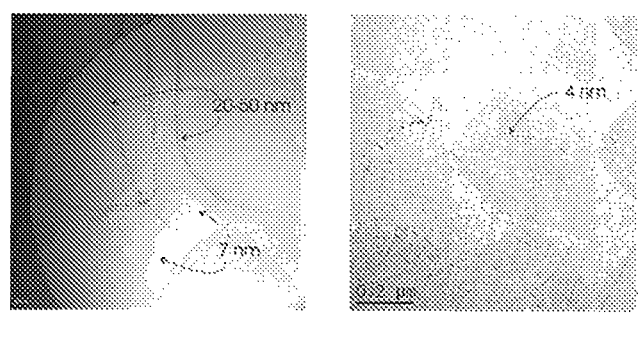
FIG. 1 illustrates Cryo-TEM images of nanofibrillar cellulose hydrogels: opaque native (left) and transparent oxidized nanofibrillar cellulose (right)

The term "nanofibrillar cellulose (NFC)" as used herein refers to isolated cellulose fibers and fiber bundles having a diameter in the submicron range. The dimensions of the fibers and fiber bundles are dependent on raw material and disintegration method.

The celluloses utilized in NFC may be obtained from any cellulose raw material based on any plant material that contains cellulose, any microbial cellulose, or any cellulose raw material source that can be used in production of cellulose pulp, refined pulp, and NFC.

Plant material may be any wood derived or non-wood derived plant material. Said wood may be selected from softwood (SW) trees, such as spruce, pine, fir, larch, douglas-fir and hemlock, from hardwood (HW) trees, such as birch, aspen, poplar, alder, eucalyptus and acacia, and from mixtures of softwoods and hardwoods. Said non-wood plant material may be selected from agricultural residues, grasses and other plant materials, such as straw, leaves, bark, seeds, hulls, flowers, vegetables and fruits, from cotton, corn, wheat, oat, rye, barley, rice, flax, hemp, manila hemp, sisal hemp, jute, ramie, kenaf, bagasse, bamboo and reed.

The cellulose raw material may also be derived from cellulose-producing micro-organisms, such as materials obtained from bacterial fermentation processes. The micro-organisms may be selected from the genus *Acetobacter, Agrobacterium, Rhizobium, Pseudomonas,* and *Alcaligenes,* suitably the genus *Acetobacter* and particularly suitably the species *Acetobacter xylinum* or *Acetobacter pasteurianus.* Cellulose may also be obtained from algae, for example cellulose can be found in structural walls of green algae, brown algae, most of the red algae and most of the golden algae.

The term "cellulose pulp" refers to cellulose fibers, which are isolated from any cellulose raw material, using chemical, mechanical, thermo-mechanical, or chemo-thermo-mechanical pulping processes. Particularly cellulose pulp, which can be pulp of plant origin, especially wood (SW or HW pulp, for example bleached birch pulp) and where the cellulose molecules are oxidized, is easy to disintegrate to NFC.

NFC with desired properties and dimensions may be obtained by mechanical disintegration of cellulose pulp, oxidized cellulose raw material, microbial cellulose etc., carried out with suitable equipment, such as a refiner, grinder, homogenizer, colloider, friction grinder, ultrasound-sonicator, or fluidizer such as microfluidizer, macrofluidizer, or fluidizer-type homogenizer, most preferably with a homogenizer or a fluidizer. Thus NFC refers to mechanically disintegrated products. Several different grades (types) of NFCs have been developed using various production techniques. The grades have different properties depending on the manufacturing method, degree of fibrillation and chemical composition. The chemical compositions of the grades also vary. Depending on the raw material source, e.g. HW vs. SW pulp, different polysaccharide composition exists in the final NFC product. Typically, native or non-derivatized grades have larger diameters and wider fibril size distribution while the derivatized grades have smaller diameters and narrower size distributions. Derivatized grades of NFC may be blended with native grade for enhancing binding of certain compounds to the gel or varying other properties etc.

Thus herein NFC is understood to encompass native NFC or NFC bundles and also any chemically or physically derivatized NFC or NFC bundles. The chemical derivatisation may be based for example on carboxymethylation, oxidation, TEMPO-mediated oxidation, esterification, or etherification reaction of cellulose molecules. Modified NFC can for example be anionically or cationically charged NFC containing anionically or cationically charged groups, respectively. Examples of anionically charged NFC include oxidized nanofibrillar cellulose and carboxymethylated nanofibrillar cellulose. In oxidized NFC at least some of the C6 primary hydroxyl groups of cellulose are selectively oxidized to carbonyl groups, i.e. aldehydes and/or carboxyl groups. Oxidized NFC can be obtained for example catalytically by a heterocyclic nitroxyl compound mediated oxidation, for example by 2,2,6,6-tetramethylpiperidinyl-1-oxyl free radical (TEMPO)-mediated oxidation. Thus the term "TEMPO oxidized NFC" refers to nanofibrillar cellulose obtained through TEMPO mediated oxidation. Examples of cationically charged NFC include chemically modified cellulose that contains quaternary ammonium groups as a result of the modification. Derivatisation may also be realized by physical adsorption of anionic, cationic, or non-ionic substances or any combination of these on cellulose surface. The described derivatisation can be carried out before, after, or during the production of NFC. Derivatized grades are typically prepared from bleached pulps. In the derivatized grades, any hemicelluloses present may also be derivatized together with the cellulose domain.

Figure 2:
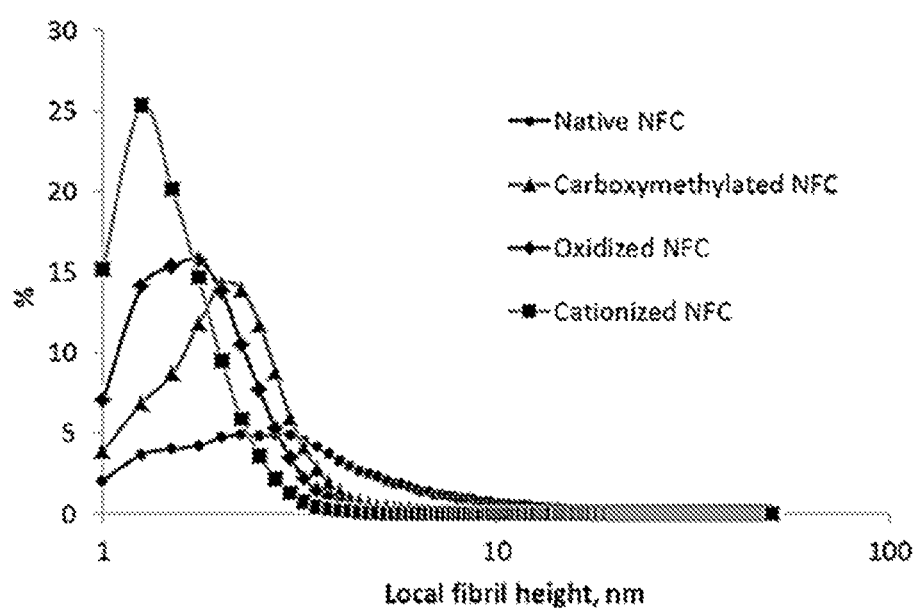
FIG. 2 illustrates size distributions of different nanofibrillar cellulose (NFC) grades measured from atomic force microscopy images (AFM)

The length of the nanofibrillar cellulose may exceed one micrometer while the number-average fiber diameter is typically below 500 nm. The length of nanofibrillar cellulose is somewhat challenging to measure accurately. The number average diameter of native type NFC or NFC bundles may range from 1 to 500 nm, preferably from 2 to 200 nm, more preferably from 5 to 100 nm, most preferably from 7 to 20 nm. The length of NFC varies from 0.3 to 50 micrometers, preferably from 0.3 to 20 micrometers, and most preferably from 0.5 to 10 micrometers. From Cryo-TEM images, also the bundled structure can be seen: the native grades are often mixtures of 7 nm elementary fibers and 20 to 50 nm fiber bundles, as can be seen in FIG. 1 illustrating Cryo-TEM images of nanofibrillar cellulose hydrogels, opaque native (1a) and transparent anionic NFC (1b). The derivatized NFCs are typically thinner, the number average diameter varying from 2 to 200 nm, preferably from 2 to 20 nm, most preferably from 2 to 6 nm. FIG. 2 illustrates size distributions of different nano-fibrillar cellulose (NFC) grades measured from atomic force microscopy images (AFM) All the information regarding sizes may be determined from electron microscopy images.

The term "cementitious material" refers to any of various building materials which can be prepared by mixing a liquid, preferably water, with a chemically reacting material, e.g. cement, to form a plastic paste and to which an aggregate may be added if desired. Examples of cementitious materials include mortar, grout, concrete, in particular foamed concrete and self-compacting concrete. Examples of chemically, especially hydraulically, reacting materials are cement and lime.

"Foamed concrete" also known as foamed cement, lightweight aerated concrete, and cellular concrete, refers to cementitious material containing at least 20 vol % of mechanically entrained foam in plastic paste or mortar. The air voids have typically average diameter of 0.1 to 3.0 mm. Foams are produced by help of foaming agents that can be protein based, chemical surfactants, or enzyme based. Lightweight concrete can contain other light material such as polymer particles, e.g. expanded polystyrene (i.e. styrox) granulates besides air. The density of foamed concrete is typically from 300 to 1800 kg/m$^2$.

"Self-compacting concrete" or "self-consolidating concrete" (SCC) refers to highly flowable, non-segregating concrete that spreads into place, fills formwork, and encapsulates even the most congested reinforcement, all without any mechanical vibration. It is defined as a concrete mixture that can be set purely by means of its own weight, with no vibration.

"Autoclaved aerated concrete" (AAC) refers to cementitious material in which quartz sand, lime and/or cement is used as binder. Typically aluminium powder is used at an amount of 0.05 to 0.08% by volume, depending on the pre-specified density. In AAC aluminum powder reacts with calcium hydroxide and water to form hydrogen. The hydrogen gas foams and doubles the volume of the raw mix creating gas bubbles up to 3 mm in diameter. At the end of the foaming process, the hydrogen escapes into the atmosphere and is replaced by air.

"Gas-entrainment" refers to intentional creation of gas bubbles in concrete. The bubbles are introduced into the concrete by addition of a gas-entraining agent. The gas bubbles are created during mixing of the plastic (flowable, not hardened) cementitious material, and most of them survive to be part of the hardened cementitious material. The gas is typically air, but it may also be some other suitable gas, e.g. hydrogen, in the case of AAC. Thus analogously "air-entrainment" refers to intentional creation of dry air bubbles in concrete by addition of an air-entraining agent.

Accordingly the present invention provides use of nanofibrillar cellulose (NFC) as a gas-entrainment stabilizer. Gas-entrainment of cementitious materials is achieved together with at least one gas-entraining agent.

In an aspect of the invention the used NFC has a fiber or fiber bundle diameter of less than 1 µm, preferably less than 200 nm, more preferably less than 100 nm. NFC can be unmodified or chemically or physically modified derivative of NFC or NFC bundles. Preferably NFC is chemically modified. More preferably NFC is anionically charged NFC, in particular oxidized NFC or carboxymethylated NFC. The smaller the NFC fibers or fiber bundles are the smaller amount of NFC is required for the desired properties of the cementitious material treated with NFC. The size distribution of the chemically modified NFC is generally smaller than that of the native NFC. Most preferably NFC is mechanically disintegrated TEMPO oxidized NFC.

The present invention particularly relates to use of NFC as an air-entrainment stabilizer in cementitious composition, paste, or material. The present invention further relates to use of NFC for providing air-entrained cementitious material with improved gas pore, in particular air pore, structure quality and/or stability and/or robustness with regard to water content variation. NFC can be used in a wide variety of cementitious materials as defined herein.

The present invention also provides a method for providing air-entrained cementitious material with improved air pore structure quality and/or stability and/or robustness with regard to water content variation, comprising providing nanofibrillar cellulose (NFC), providing at least one gas-entraining agent; mixing said NFC and the said at least one air-entraining agent with a cementitious composition, which comprises at least binder, and water to obtain a cementitious paste, and allowing the thus obtained cementitious paste to harden to obtain gas-entrained cementitious material. In an aspect of the invention the cementitious paste is cast and allowed to harden in a mold.

For providing gas-entrained cementitious materials at least one gas-entraining agent is to be added to the cementitious composition for introducing gas bubbles into the cementitious paste. The gas-entraining agent can be pre-mixed in the cementitious composition or added prior to or during mixing of the cementitious paste.

In one aspect of the invention the gas-entraining agent is an air-entraining agent and the obtained gas-entrained cementitious material is air-entrained cementitious material such as concrete, in particular foamed concrete or SCC. In alternative aspect of the invention the gas-entraining agent is a hydrogen producing agent such as aluminum powder and the obtained as-entrained cementitious material is hydrogen-entrained cementitious material such as ACC.

The cementitious composition contains at least one binder. Binder refers to a chemically, especially hydraulically, reacting material, e.g. cement and other cementitious binders such as fly ash and slag. In concrete the binder serves as a binder for the aggregate. Cements include but are not limited to common Portland cements, fast setting or extra fast setting, sulphate resisting cements, modified cements, alumina cements, high alumina cements, calcium aluminate cements and cements which contain secondary components such as fly ash, pozzolana, and the like.

The cementitious composition may further comprise other materials such as aggregate and reinforcement materials. The aggregate would typically be a coarse aggregate, such as gravel, limestone, or granite, and/or fine aggregate, such as sand. Crushed stone or recycled crushed concrete can also be used as aggregates. The term "aggregate material" in general refers to granular material suitable for use in concrete. Aggregates may be natural, artificial, or recycled from material previously used in construction.

Chemical admixtures such as accelerators, retarders, plasticizers, pigments, corrosion inhibitors, bonding agents, and/or pumping aids, etc. can further be comprised in the cementitious composition. The composition may still further comprise mineral additives such as fly ash, ground granulated blast furnace slag, silica fume, and/or metakaolin.

Typically the cementitious composition is mixed with water, before use. This results in a formation of a cementitious paste. The water/cement ratio (w/c) of the cementitious paste preferably is from 0.25 to 1.50, more preferably from 0.35 to 0.8, most preferably from 0.40 to 0.65.

In an aspect of the invention the used amount of dry NFC is 0.01% or more based on dry weight of binder in the cementitious composition, preferably from 0.01% to 0.3%, more preferably from 0.02% to 0.2%, most preferably from 0.05% to 0.11%.

After the gas-entraining agent and NFC have been added to the cementitious composition it is mixed in conventional manner and left to harden. Hardened gas-entrained cementitious normal weight material and cement paste fraction included in it, or normal weight cement paste fraction included in any lightweight material have air pore spacing factor less than 0.4 mm, preferably from 0.2 to 0.35 mm, more preferably from 0.22 to 0.3 mm. Further, the gas pores in the hardened normal weight material and cement paste fraction included in it, or normal weight cement paste fraction included in any light-weight material, have air pore specific surface greater than 20 $mm^2/mm^3$, preferably greater than 25 $mm^2/mm^3$.

The use of NFC as a gas-entrainment stabilizer and the methods of the present invention make it possible to provide hardened gas-entrained cementitious materials without the usual problems associate with air-entrained concrete and other gas-entrained cementitious materials. The use of NFC in cementitious materials provides fresh cementitious paste having consistent gas, in particular air, content and density regardless of the reasonable water/cement ratio variation during production. Furthermore, its use provides hardened gas-entrained cementitious materials having high gas pore structure quality and stability and consistent density.

The following examples illustrate the invention.

EXAMPLES

Materials
Cellulose Material

The cellulose material used in examples 1 and 2 was nano-fibrillar cellulose that was anionically derivatized.

The cellulose material used in examples 3, 4 and 5 was native, non-derivatized NFC.

Native, Non-Derivatized NFC
  Concentration 1.5 weight %
  Translucent or opaque, turbidity 150 AU
  Slightly anionic surface charge, −2 mV
  Fiber diameter 7 nm nanofibers +20-50 nm fibril bundles, length several micrometers.
  Number of un-fibrillated particles 200 (particles/mg), FiberLab
  Carbohydrate composition: 72.8% Glucose, 25.6% Xylose, 1.4% Mannose
  Fibrillated with industrial fluidizer (Microfluidics ltd.)
  Zero shear viscosity of 0.5 wt % sample 8 000 Pa s and yield stress 5 Pa.
  Zero shear viscosity of 1.0 wt % sample 30 000 Pa s and yield stress 20 Pa.
  Storage modulus of 0.5 wt % sample G'=10 Pa Anionically derivatized NFC
  TEMPO mediated oxidation prior to fibrillation, carboxylic acid content 1000 micromol/g
  Concentration 0.79 weight
  Transparent, turbidity 20 AU
  Highly anionic surface charge, −39 mV
  Fiber diameter 2-6 nm, length 500 nm-2000 nm.
  Number of un-fibrillated particles 100 (particles/mg), FiberLab
  Carbohydrate composition: Raw material similar to native grade, but after modification the product contains also carbohydrate structures with carboxylic acid groups in C6 position.
  Fibrillated with industrial fluidizer (Microfluidics ltd.)
  Zero shear viscosity of 0.5 wt % sample 4 000 Pa s and yield stress 3 Pa.
  Zero shear viscosity of 0.8 wt % sample 35 000 Pa s and yield stress 22 Pa.
  Storage modulus of 0.5 wt % sample G'=5 Pa Cryo-TEM images of nanofibrillar cellulose hydrogels are presented in FIG. 1, native (1a) and anionic NFC (1b).

Cement and Additives

The cement used in examples 1 and 2 was Plussementti CEM II/B-M (S-LL) 42,5 N, Finnsementti Oy, Finland. Plasticizer and air entraining agents used were Glenium C151 (15%) from BASF Oy and Ilma-Parmix from Finnsementti Oy respectively. The concrete contained natural finnish aggregates.

The cement used in examples 3, 4 and 5 was white Portland cement CEM I 52.5 N from Finnsementti Oy, Finland. Plasticizer and foaming agent used were Glenium 51 (17.5%) from BASF Oy and Schaumbildner 285 synthetic foaming agent from Semtu, Finland, respectively. The filler aggregates used were from Rudus Oy, Finland.

Example 1. Air Content and Air Pore Structure Quality

Four cement composition of self-compacting concrete (SCC) with and without nanofibrillar cellulose (NFC) and with the same total air content were prepared. The formulations of the compositions are shown below in Table 1.

The effect of water content change to the air content and air pore structure quality was studied by addition of 4% extra water (11 vs. 12 and 13 vs. 14). Water/cement (w/c) ratio of the reference SCC and NFC admixture SCC was 0.45. The amount of added air entraining agent was 0.07% of cement content. Added plasticizer was 1.45-1.53% of cement. Mixes contained aggregates 1660 kg/m³.

TABLE 1

| Concrete formulation | | | | |
|---|---|---|---|---|
| | 11 | 12 | 13 | 14 |
| Cement (Plussementti/Finnsementti) [kg/m³] | 430 | 430 | 430 | 430 |
| Aggregate total [kg/m³] | 1660 | 1660 | 1660 | 1660 |
| Total water [kg/m³] | 193 | 201 | 193 | 201 |
| Glenium C151 (15%) [% of cement] | 1.45 | 1.45 | 1.53 | 1.53 |
| Air entraining agent (Ilma-Parmix) [% of cement] | 0.07 | 0.07 | 0.07 | 0.07 |
| Water/cement ratio (w/c) | 0.45 | 0.47 | 0.45 | 0.47 |
| Biofibrils [% of cement] | 0 | 0 | 0.06 | 0.06 |

The air content and the air pore structure quality were analyzed for each of the cement compositions. The air pore analysis was made principally according to VTT TEST R003-00-2010 "Testing instruction. Air void analysis. Method of measurement. Definition of the air void parameters of concrete from thin sections." VTT Expert Services Oy, 7.12.2011, 11 p. Thin sections were studied using a Leica DM LP polarization and fluorescence microscope. Micrographs were taken with a Leica image analyzer.

Figure 3:
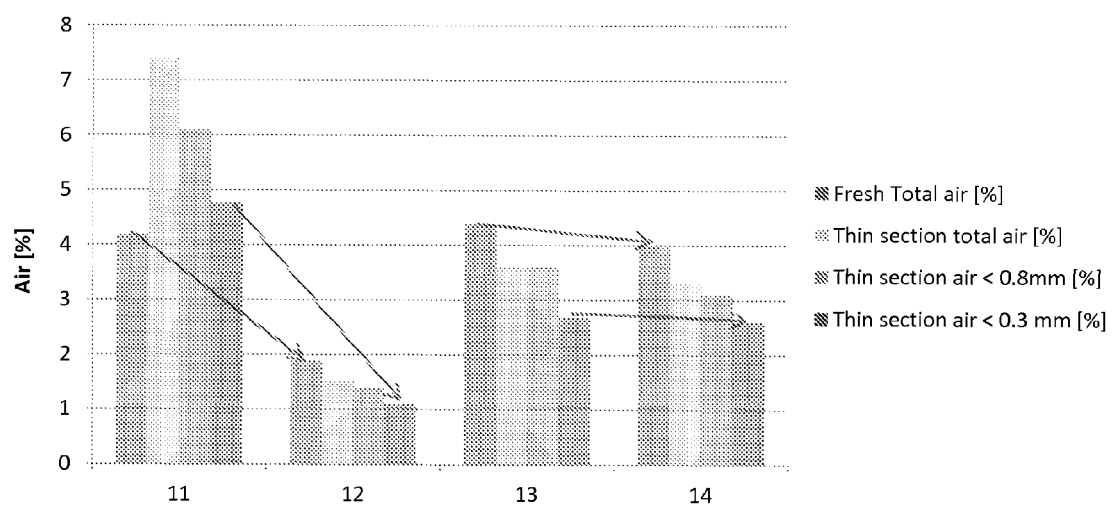
FIG. 3 illustrates total air content and air pore structure of self-compacting concrete (SCC) with and without NFC, and the effect of water content change.

The results are presented in FIG. 3. As can be seen from FIG. 3 the amount of total air in fresh concrete without NFC (11) decreased 55% when 4% of water was added (12). There was the same kind of decrease in the thin section air for air pores <0.3 mm. With the addition of 4% water the thin section air <0.3 mm decreased 77%. When 0.06% of NFC had been added to the mix (13) the additional water (14) did not really change the air content. The total fresh air decreased only 9.1% and the thin section air for air pores <0.3 mm 3.7%. It is clear from the results that the water content variation is possible in the concrete compositions comprising NFC without losing the air content in the concrete.

Example 2. Air Content of Different Compositions

Three cement compositions were prepared. Reference composition (21) contained no NFC. The other two compositions comprised: 0.03% NFC of the amount of cement (22) and 0.06% NFC of the amount of cement (23). The formulations of the cement compositions are shown in Table 2.

TABLE 2

| Concrete formulation | | | |
|---|---|---|---|
| | 21 | 22 | 23 |
| Cement (Plussementti/Finnsementti) [kg/m³] | 430 | 430 | 430 |
| Aggregate total [kg/m³] | 1660 | 1660 | 1660 |
| Total water [kg/m³] | 201 | 201 | 201 |
| Glenium C151 (15%) [% of cement] | 1.45 | 1.5 | 1.53 |
| air entraining agent (Ilma-Parmix) [% of cement] | 0.07 | 0.07 | 0.07 |
| water/cement ratio (w/c) | 0.47 | 0.47 | 0.47 |
| NFC [% of cement) | — | 0.03 | 0.04 |

Air pore analysis was made principally according to VTT TEST R003-00-2012 "Testing instruction. Air void analysis. Method of measurement. Definition of the air void parameters of concrete from thin sections." VTT Expert Services Oy, 7.12.2011, 11 p. Thin sections were studied using a Leica DM LP polarization and fluorescence microscope. Micrographs were taken with a Leica image analyzer.

Figure 4:
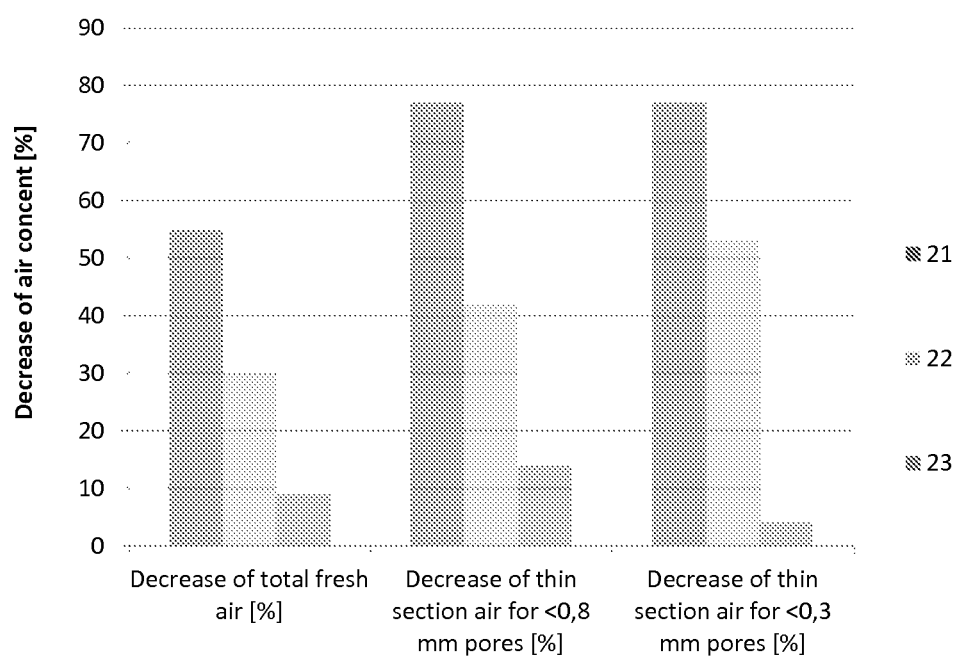
FIG. 4 illustrates total fresh concrete air content and thin section air content of several SCC compositions with different amounts of NFC.

The results are presented in FIG. 4. As can be seen from FIG. 4 the decrease of total fresh air content and thin section air content for the smaller air pores is high for the reference composition (21). The smaller the decrease of air is, the more the concrete mix can withstand the variation of water content in concrete, which is desired. The decrease of total fresh air content and thin section air content for the smaller air pores is high for the reference composition (21). When NFC has been used as an admixture in concrete, additional water does not have as profound effect on the air content compared to reference. The decrease of total fresh air content and thin section air pores is lower with NFC admixture (22 and 23) as compared to reference (21)

Example 3. Slump Flow

The cement compositions of Example 2 were subjected to a slump-flow test.

Slump flow is a measure of concrete workability. Flows from 550 mm to 850 mm are acceptable for SCC. All the slump flows were within acceptable range, and in spite of the addition of NFC the workability could be maintained within a desired workability range (difference <100 mm). The workability of the mixtures was similar and within acceptable range measured by slump-flow.

Example 4. Fresh Concrete Densities with and without NFC

Eight foam concrete compositions with and without NFC were produced and their properties were compared. The produced concretes contained 1000 g cement, 970 g filler aggregate, 3.76 g (dry) (0.38% of cement) foaming agent, and 20 g superplasticizer (dry material 17.5%). The amount of NFC varied from 0 to 0.11% of cement and the water-cement ratio (w/c) varied from 0.43 to 0.64 as shown in Table 4.

TABLE 4

| | water/cement ratio (w/c) | NFC [%] |
|---|---|---|
| 31 | 0.50 | 0.11 |
| 32 | 0.53 | 0.11 |
| 33 | 0.59 | 0.11 |
| 34 | 0.64 | 0.11 |

TABLE 4-continued

| | water/cement ratio (w/c) | NFC [%] |
|---|---|---|
| 35 | 0.43 | — |
| 36 | 0.48 | — |
| 37 | 0.51 | — |
| 38 | 0.53 | — |

Figure 5:
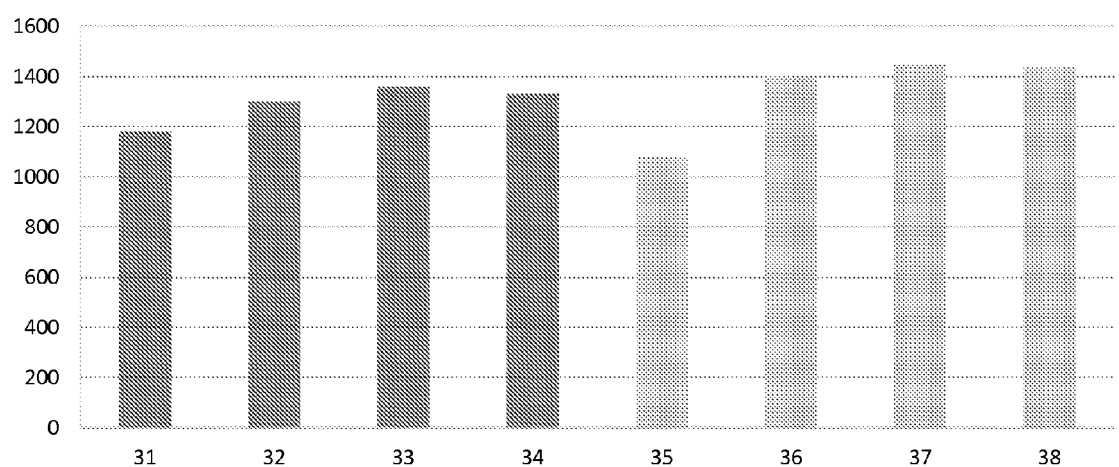
FIG. 5 illustrates fresh concrete densities of foam concretes with and without NFC.

The results are presented in FIG. 5. As can be seen from FIG. 5 the density of the fresh concrete containing NFC was lower than that of untreated concrete, and this was regardless of the water/cement ratio variation, i.e. foam concrete compositions with high robustness were achieved.

Example 5. Fresh and Hardened Foam Concrete Densities with and without NFC

Six foam concrete compositions with and without NFC were prepared and their properties were compared. The basic concrete composition was as defined in Example 3. The amount of NFC varied from 0 to 0.11% of cement and the water-cement ratio (w/c) varied from 0.43 to 0.64 as shown in Table 5.

TABLE 5

| | water/cement ratio (w/c) | NFC [%] |
|---|---|---|
| 41 | 0.53 | — |
| 42 | 0.48 | — |
| 43 | 0.45 | — |
| 44 | 0.53 | 0.05 |
| 45 | 0.53 | 0.11 |
| 46 | 0.64 | 0.11 |

Specimens were casted of each of the compositions for testing of fresh concrete stability and robustness and of hardened concrete properties, i.e. pore structure characterisation and compressive strength. Fresh compositions were casted without any vibration in a cardboard pot (about h 230 mm×80 mm×75 mm). After hardening the specimen were cut in 3 parts: upper part (Y), middle part (K) and lowest part (A). After that all specimen were maintained in water for 1 day. After that the densities for the upper (Y), middle (K) and lowest (A) part were determined by weighing in water and air.

For some compositions without NFC (reference compositions 41 and 42), the casted specimen collapsed before setting and hardening, and there was only minor air content left in the specimen. This meant also, that in these cases there was no upper part left.

Stability of the compositions was evaluated by comparing fresh foam concrete density with hardened concrete density. Stability was also evaluated by comparing densities for specimen upper (Y) and lowest part (A). Curing of the specimen was in plastic at RH 95%. Testing age was 28 d.

Figure 6:
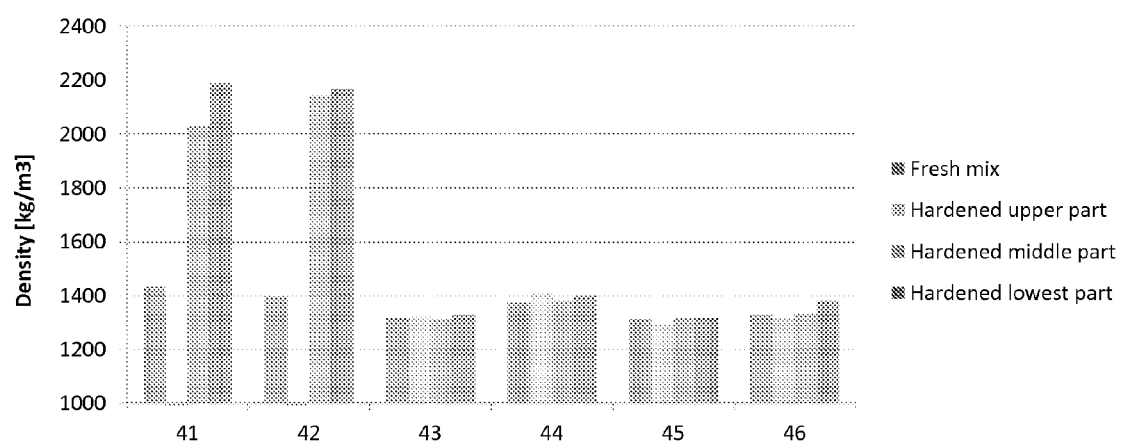
FIG. 6 illustrates fresh and hardened concrete densities of foam concrete with and without NFC.

The results are presented in FIG. 6. As can be seen from FIG. 6 the compositions with w/c ratios of 0.48 (41) and 0.53 (42) the hardened upper part collapsed totally and thus it was not possible to produce stable foam concrete with these parameters without any NFC. However, when 0.05% of NFC was added to the concrete mixture it was possible to produce stable foam concrete. The stability and robustness of NFC stabilized concrete is better as compared to reference concrete. The change in air pore quantity and density when the amount of water is changed is smaller compared to reference concrete.

For stable foam concrete there should not be high density differences between hardened and fresh concrete. Also density of the upper part of a casted specimen should be about the same as the density for the lowest part. If foam concrete pore structure is unstable and there is e.g. high drainage, there will be density, air pore content and structure differences along specimen or concrete structure height. With increasing density, cohesion increases leading to decreased workability measured by fresh concrete flow. However, smaller density stabile concretes, like NFC stabilized concretes, have good workability and are self-compacting.

Example 5

Six concrete compositions were prepared. The basic concrete composition had the same composition as used in Example 3.

TABLE 6

| | water/cement ratio (w/c) | NFC [%] |
|---|---|---|
| 51 | 0.53 | 0.05 |
| 52 | 0.53 | 0.11 |
| 53 | 0.64 | 0.11 |
| 54 | 0.43 | — |
| 55 | 0.48 | — |
| 56 | 0.53 | — |

The homogeneity and quality of hardened concrete was studied by cutting the hardened concrete specimen into 3 parts: upper, middle and lowest part. Stability of the mixes were evaluated by comparing fresh foam concrete density with hardened concrete density, and by comparing the densities of the upper, middle and lowest part of the hardened specimen. Microscopical examination of broken specimen surfaces was done to get information on air pore sizes and air pore structure. Only one specimen per compositions was tested. This specimen was the middle part (K) of the casted specimen, except for the collapsed specimen without NFC where it was lowest part (A). Micrographs of air-entrained foam concrete pore structures were taken.

Figure 7:
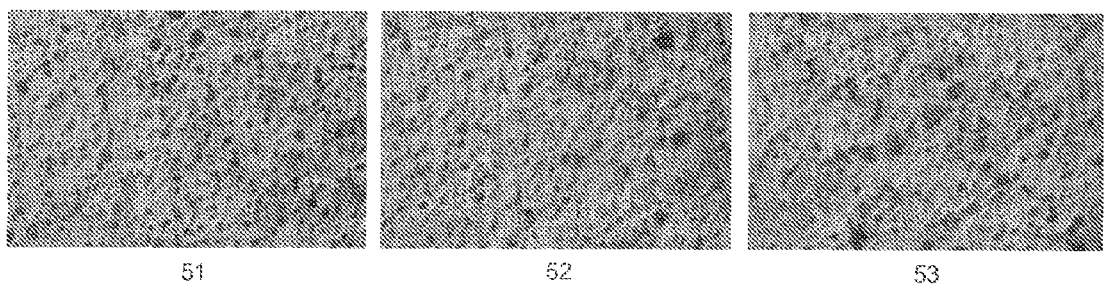
FIG. 7 shows micrographs of foam concrete pore structures with and without NFC.

As can be seen from FIG. 7, each picture width ca. 15 mm, air-entrained concrete without NFC has a relatively low specific surface area and high spacing factor. Furthermore, air is not distributed homogeneously in the hardened concrete but is present also as large air bubbles. When water is added to the system, the specific surface area and spacing factor increase. This refers to the fact that the largest air pores have escaped from the fresh composition and the average distance from cement paste to the closest air pore increases.

Interconnection of air pores diminished when NFC were used in the composition. Increasing water content of the composition had a smaller effect on the total air content and air pore structure quality when NFC was included, i.e. robustness was enhanced.

It will be obvious to a person skilled in the art that, as the technology advances, the inventive concept can be implemented in various ways. The invention and its embodiments are not limited to the examples described above but may vary within the scope of the claims.

The invention claimed is:
1. A method for stabilizing gas-entrainment of cementitious materials, comprising the steps of:
  providing nanofibrillar cellulose (NFC);
  providing at least one gas-entraining agent;

mixing said NFC and the at least one gas-entraining agent with a cementitious composition, comprising at least binder, and water to obtain a cementitious paste; and allowing the thus obtained cementitious paste to harden to obtain gas-entrained cementitious material;

wherein the gas-entrained cementitious material has an air pore spacing factor less than 0.4 mm.

2. The method as claimed in claim 1, wherein the amount of NFC is 0.01% or more by based on dry weight of binder in the cementitious composition.

3. The method as claimed in claim 1, wherein the water/cement ratio of the cementitious paste is from 0.25 to 1.50.

4. The method as claimed in claim 1, wherein the NFC has a fiber or fiber bundle diameter less than 1 micrometer.

5. The method as claimed in claim 1, wherein the NFC has a number average diameter of 2 to 200 nanometers.

6. The method as claimed in claim 1, wherein the NFC is native NFC.

7. The method as claimed in claim 1, wherein the NFC is chemically and physically modified NFC.

8. The method as claimed in claim 1, wherein the gas-entraining agent is an air-entraining agent.

9. The method as claimed in claim 1, wherein the gas-entraining agent is a hydrogen-producing agent.

10. The method as claimed in claim 1, wherein the amount of NFC is from 0.01% to 0.3% based on dry weight of binder in the cementitious composition.

11. The method as claim in claim 1, wherein the gas-entrained cementitious material comprises a normal weight cementitious composition and a lightweight cementitious paste fraction, wherein the normal weight cementitious composition fraction included in the lightweight cementitious paste fraction has a gas pore spacing factor from 0.2 to 0.35 mm.

12. A method for stabilizing gas-entrainment of cementitious materials, comprising the steps of:

providing nanofibrillar cellulose (NFC);

providing at least one gas-entraining agent;

mixing said NFC and the at least one gas-entraining agent with a cementitious composition, comprising at least binder, and water to obtain a cementitious paste; and allowing the thus obtained cementitious paste to harden to obtain gas-entrained cementitious material, the gas-entrained cementitious material having gas pores;

wherein the gas pores have an air pore specific surface greater than 20 mm$^2$/mm$^3$.

13. The method as claimed in claim 12, wherein the amount of NFC is 0.01% or more by based on dry weight of binder in the cementitious composition.

14. The method as claimed in claim 12, wherein the water/cement ratio of the cementitious paste is from 0.25 to 1.50.

15. The method as claimed in claim 12, wherein the NFC has a fiber or fiber bundle diameter of less than 1 micrometer.

16. The method as claimed in claim 12, wherein the NFC has a number average diameter of 2 to 200 nanometers.

17. The method as claimed in claim 12, wherein the NFC is native NFC.

18. The method as claimed in claim 12, wherein the NFC is chemically and physically modified NFC.

19. The method as claimed in claim 12, wherein the gas-entraining agent is an air-entraining agent.

20. The method as claimed in claim 12, wherein the gas-entraining agent is a hydrogen-producing agent.

21. The method as claimed in claim 12, wherein the amount of NFC is from 0.01% to 0.3% based on the dry weight of binder in the cementitious composition.

22. The method as claim in claim 12, wherein the gas-entrained cementitious material comprises a normal weight cementitious composition and a lightweight cementitious paste fraction, wherein the normal weight cementitious composition fraction included in the lightweight cementitious paste fraction has a gas pore spacing factor from 0.2 to 0.35 mm.

23. A hardened gas-entrained cementitious material comprising nanofibrillar cellulose (NFC), having a void spacing factor less than 0.4 mm, wherein void spacing factor is a maximum distance from any point in a capillary system to a surface of a nearest air bubble.

24. The hardened gas-entrained cementitious material as claimed in claim 23, which is foamed concrete, self-compacting concrete (SCC) or autoclaved aerated concrete (ACC).

25. The hardened gas-entrained cementitious material as claimed in claim 23, obtained by a method comprising the steps of:

providing nanofibrillar cellulose (NFC);

providing at least one gas-entraining agent;

mixing said NFC and the at least one gas-entraining agent with a cementitious composition, comprising at least binder, and water to obtain a cementitious paste; and allowing the thus obtained cementitious paste to harden to obtain gas-entrained cementitious material.

26. The hardened gas-entrained cementitious material as claimed in claim 23, wherein the gas-entrained cementitious material is air-entrained cementitious material.

27. The hardened gas-entrained cementitious material as claimed in claim 23, wherein the gas-entrained cementitious material is hydrogen-entrained cementitious material.

28. A hardened gas-entrained cementitious material comprising nanofibrillar cellulose (NFC), having specific surface greater than 20 mm$^2$/mm$^3$.

29. The hardened gas-entrained cementitious material as claimed in claim 28, which is foamed concrete, self-compacting concrete (SCC) or autoclaved aerated concrete (ACC).

30. The hardened gas-entrained cementitious material as claimed in claim 28, obtained by a method comprising the steps of:

providing nanofibrillar cellulose (NFC);

providing at least one gas-entraining agent;

mixing said NFC and the at least one gas-entraining agent with a cementitious composition, comprising at least binder, and water to obtain a cementitious paste; and allowing the thus obtained cementitious paste to harden to obtain gas-entrained cementitious material.

31. The hardened gas-entrained cementitious material as claimed in claim 28, wherein the gas-entrained cementitious material is air-entrained cementitious material.

32. The hardened gas-entrained cementitious material as claimed in claim 28, wherein the gas-entrained cementitious material is hydrogen-entrained cementitious material.

* * * * *